United States Patent [19]

Girgis

[11] 4,436,866
[45] * Mar. 13, 1984

[54] AQUEOUS, ADHESIVE COATING COMPOSITION WITH A NON-SELFCROSSLINKABLE ELASTOMER FOR USE WITH FILAMENTARY MATERIALS

[75] Inventor: Mikhail M. Girgis, Pittsburgh, Pa.

[73] Assignee: PPG Industries, Inc., Pittsburgh, Pa.

[ * ] Notice: The portion of the term of this patent subsequent to Sep. 20, 2000 has been disclaimed.

[21] Appl. No.: 324,750

[22] Filed: Nov. 25, 1981

Related U.S. Application Data

[63] Continuation-in-part of Ser. No. 238,725, Feb. 27, 1981, Pat. No. 4,405,746.

[51] Int. Cl.³ .............................................. C08L 61/12
[52] U.S. Cl. ..................................... 524/510; 428/378; 428/394; 524/323; 524/487; 524/488; 524/572; 524/573
[58] Field of Search ............... 524/510, 501, 572, 573, 524/575, 596, 501, 323, 487, 488; 428/378, 394; 525/139

[56] References Cited

U.S. PATENT DOCUMENTS

| | | | |
|---|---|---|---|
| 2,615,826 | 10/1952 | Mallory et al. | 154/46 |
| 3,256,234 | 6/1966 | Miller | 260/29.7 |
| 3,330,689 | 7/1967 | Ells et al. | 117/76 |
| 3,414,458 | 12/1968 | Lacy | 161/67 |
| 3,424,608 | 1/1969 | Marzocchi et al. | 117/72 |
| 3,437,122 | 4/1969 | Van Gils | 152/330 |
| 3,533,830 | 10/1970 | Marzocchi et al. | 260/29.3 |
| 3,567,671 | 3/1971 | Janetos et al. | 260/28.5 |
| 3,728,146 | 4/1973 | Marzocchi | 117/72 |
| 3,741,854 | 6/1973 | DeGoria | 161/67 |
| 3,787,224 | 1/1974 | Uffner | 117/72 |
| 3,817,775 | 6/1974 | Coakley et al. | 260/28.5 B |
| 3,837,898 | 9/1974 | McCombs et al. | 117/72 |
| 3,853,692 | 12/1974 | Clayton et al. | 161/193 |
| 3,864,195 | 2/1975 | Patterson | 161/66 |
| 3,914,499 | 10/1975 | Siefert | 428/292 |
| 3,973,071 | 8/1976 | Fahey | 428/292 |
| 4,014,835 | 3/1977 | McCombs | 260/29.3 |
| 4,060,658 | 11/1977 | Lin et al. | 428/378 |
| 4,197,228 | 4/1980 | Lin et al. | 260/28.5 B |
| 4,251,409 | 2/1981 | Neubert | 260/29.3 |
| 4,263,362 | 4/1981 | Straka | 428/258 |

FOREIGN PATENT DOCUMENTS 870165 9/1978 Belgium .
54-90339 7/1979 Japan .
54-124047 9/1979 Japan .
621694 8/1978 U.S.S.R. .
630269 10/1978 U.S.S.R. .

OTHER PUBLICATIONS

Russian Article entitled, "Low Temperature Properties of 1,4-cis-Polybutadiene in Non-Freezing Tires", by G. M. Galybin et al.
Russian Article entitled, "The Structure of Mixtures of SKD Rubber with Rubber Containing Functional Groups", by Chirkova et al.
Article entitled, "The Effect of Treatment on the Crystallization of cis-1,4-Butadiene Rubber on its Technological Properties", by Chirkova et al.

Primary Examiner—Theodore E. Pertilla
Attorney, Agent, or Firm—Kenneth J. Stachel

[57] ABSTRACT

An aqueous coating composition is provided for filamentary materials that yields coated filamentary material with improved weavability and that yields reinforced elastomeric materials having improved properties of flexibility and fatigue resistance. The aqueous adhesive coating composition has a vinyl-pyridine-containing copolymer or terpolymer latex, a non-selfcrosslinkable elastomeric latex, a carboxylated butadiene polymer, and a phenolic aldehyde condensate polymer. The vinyl pyridine-containing elastomeric latex is produced from a vinyl pyridine-containing monomer, 1,3-diene hydrocarbon monomer or the terpolymer is produced in the same way with the addition of a vinyl containing monomer. The non-selfcrosslinkable elastomeric latex has a low gel content of less than around 40 weight percent and a low average particle size of less than around 2000 angstroms. The carboxylated butadiene polymer or butadiene styrene copolymer has less than 75 percent bound styrene and about 1 to 10 weight percent carboxylation, where both values are based on the weight of the carboxylated polymer or copolymer. The amount of the carboxylated butadiene polymer or butadiene styrene copolymer in the coating is in the range of 3 to about 10 weight percent on the basis of a dried coating. In addition, the aqueous adhesive coating composition may contain a wax emulsion, and antioxidant.

The aqueous adhesive coating composition is used to treat filamentary material, which are then dried or dried and partially cured, and combined with the elastomeric matrix material to produce reinforced elastomeric products.

20 Claims, No Drawings

AQUEOUS, ADHESIVE COATING COMPOSITION WITH A NON-SELFCROSSLINKABLE ELASTOMER FOR USE WITH FILAMENTARY MATERIALS

This application is a continuation-in-part application of application Ser. No. 238,725, filed Feb. 27, 1981. U.S. Pat. No. 4,405,746.

The present invention is directed to an improved aqueous coating composition for treating filamentary materials and coated filamentary material for use in reinforcing elastomeric matrix materials.

More particularly, the present invention is directed to tire cord produced from filamentary materials such as glass fibers coated with the dried residue of an improved aqueous adhesive coating composition.

Filamentary materials such as naturally occurring fibers like cotton and silk; and synthetic fibers such as rayon, nylon, polyester and glass fibers have been used extensively as reinforcing material in rubber to produce reinforced rubber products. These products include among others pneumatic tires, power-drive belts, conveyor belts, high pressure hoses and the like. The glass fibers are excellent filamentary material for reinforced elastomeric materials and are generally superior to the natural and synthetic organic filamentary materials. This superiority rests in the greater resistivity of the glass fibers to elongation or deformation under stress over that of the other filamentary materials.

Glass fiber strands have been used with a variety of aqueous adhesive coating compositions and used in myriad constructions for reinforcing elastomeric materials. When coated glass fiber strands were first used in biased belted tires, the coated glass fiber strand cord, a bundle of coated strands, was based on ten strands of G-150 glass fiber strands having the dried residue of the aqueous adhesive coating. The designation G-150 uses the letter to indicate the diameter of the glass fibers constituting the glass fiber strands. In this case the "G" fiber diameter is around 9 microns. The number "150" designates the strand count in hundreds or the base glass weight of the basic strand. The 150 indicates that the glass weight is 15,000 yards per pound and gives an indication of how many filaments constitute a strand.

The aqueous adhesive coatings used to treat the glass fiber strands used as cord to reinforce rubber products such as tires, consisted mainly of a latex and a resorcinorol-formaldehyde-resin in an aqueous system. Types of latices that have been included in the adhesive compositions include vinyl pyridine-butadiene-styrene terpolymers, styrene-butadiene copolymers along with their carboxylated derivatives, butadiene homopolymers, isoprene, neoprene, natural rubber, and other synthetic latices.

Over a number of years the adhesive coating, cord construction, and production methods of the filamentary materials have all been refined to provide reinforced elastomeric materials with improved fatigue resistance. When the filamentary material is glass fibers, such refinements include the construction of glass fiber strand cord from glass fibers that are more economically produced in the glass fiber forming and processing areas. The totality of the improvements have lead to the use of the glass fibers as filamentary cord for reinforcing rubber in radial tires, which during service, because of the construction of the radial tires, has many various complex load stresses placed on the filamentary reinforcement.

During the course of development of rubber reinforced with filamentary material for use in radial tires, the construction of filamentary material has been refined from the use of many strands to make up the cord to the use of fewer strands with more fibers to construct the cord. This continuing refinement of reducing the number of strands making up a cord with a concomitant increase in the number of filaments in a strand requires further refinements in the aqueous adhesive coating composition applied to the strands. The adhesive composition must possess improved properties of adhesiveness and flexibility. The importance of these properties in a coating is exemplified by observing the role of the coating when used with glass fibers as the filamentary material. The role is to serve as the bond and energy transfer system between the glass fibers and the rubber matrix. To perform this role the coating must adequately penetrate the glass fiber strands constituting the cord without detrimentally affecting the flexibility of the cord. This is particularly true for strand made of larger diameter glass fibers.

Glass fiber strand cords comprised of strands made of fibers with finer diameters offer good flexibility at the cost of increased difficulty in uniformly impregnating or coating the cord or strands. The larger diameter fibers lead to uniform coating and good impregnation, but increased fiber diameter to too high of a degree can cause cord fatigue problems. With the increase in the number of fibers in strands making up the cord, the role of the coating in the coated glass fiber strand cord is becoming more critical.

The art would benefit from the existence of an improved aqueous adhesive coating composition for treating filamentary materials chiefly glass fibers or groups of fibers, i.e., strands, to produce coated glass fiber strands for use as cord for reinforcing elastomeric materials. The improved coating would yield cord having good adhesive properties with the elastomeric material it is to reinforce, while also having good flexibility particularly with larger diameter glass fibers, to produce reinforced rubber products having improved fatigue resistance. It would also be advantageous for such an improved coating to yield cord capable of being combined with the elastomeric material to be reinforced by any of the known processes for combining the elastomeric material with a fabric. Examples of such known processes include calendering and combination of the elastomeric material with woven fabric.

It is an object of the present invention to provide an aqueous adhesive coating composition for treating filamentary material chiefly glass fibers to produce coated glass fiber strand cord having good adhesive properties and good flexibility to produce reinforced elastomeric products having good fatigue resistence, where the cord can be combined with the elastomeric material as woven fabric or by calandering.

It is an additional object of the present invention to provide cord of coated filamentary material such as glass fiber strand or strands having good adhesive qualities and good flexibility for use in reinforcing elastomeric materials, where the cord can be combined with the elastomeric material as woven fabric or by calandering.

It is another additional object of the present invention to provide cord constituted of coated glass fiber strand or strands comprised of a large number of glass fibers having a larger diameter that are more economic to produce, where the cord has good adhesiveness and flexibility and can be woven into fabric for reinforcing elastomeric material.

It is an additional further object of the present invention to provide the filamentary reinforced elastomeric material using filamentary material such as glass fibers having the dried residue of an aqueous coating composition in the form of cord or woven fabric so that the coated filamentary strands have been adhesive properties and flexibility properties to enable the reinforced elastomers to have improved fatigue resistance.

SUMMARY OF THE INVENTION

The foregoing objects and other objects that naturally result from the use of the teachings in the following disclosure are achieved by the use of the aqueous coating composition, coated filamentary strand and cord and rubber reinforced with the coated filamentary strand and cord of the present invention.

The present invention is an improvement in an aqueous adhesive coating for use with filamentary materials like glass fibers to produce coated filamentary strand or strands to reinforce elastomeric material. In its broadest aspects, the improved aqueous coating utilizes at least three elastomeric materials that give a total gel content for the coating of about 20 to about 70 weight percent wherein the three elastomeric materials are:

1. One or more elastomeric copolymer latices produced from the monomers vinyl pyridine and 1,3-diene hydrocarbon monomer or elastomeric terpolymer latex formed from the monomers vinyl pyridine; 1,3-diene hydrocarbon and styrene,
2. Non-selfcrosslinkable elastomeric latex having a gel content of less than 40 percent and an average particle size of less than around 2000 Angstroms (Å), and
3. carboxylated styrene butadiene copolymer or carboxylated butadiene polymer having an amount of bound styrene not exceeding 75 weight percent of the copolymer and having an amount of carboxylation in the range of about 1 to about 10 weight percent of the polymer and where the amount of the copolymer is present in the range of about 3 to about 10 weight percent of the coating on a dry solids basis,
4. Phenolic aldehyde condensation polymer, and
5. water.

In the improved aqueous adhesive coating composition, the nonselfcross-linkable elastomer is present in at least around 45 weight percent on a dry solids basis of the coating composition.

Other suitable components known by those skilled in the art to be useful for addition to an aqueous adhesive coating composition for treating filamentary material for reinforcing elastomeric matrix materials may also be used in the present composition. Non-exclusive examples include wax emulsions, antioxidants, additional unmodified or modified latices, additional condensation type monomers and the like.

The aqueous coating composition can be applied to sized filamentary materials or unsized filamentary materials, where the filamentary material is polyamide, rayon, cotton, glass fibers and the like by any method known to those skilled in the art. Also the aqueous coating composition can be applied to polyester fibers as the second treatment usually performed with a resorcinol formaldehyde latex (RFL) material. The coated filamentary material or strands of filamentary material are combined in any bundle construction known to those skilled in the art to be useful as cord in reinforcing elastomeric matrix materials. The filamentary material can be produced by any suitable method. For example, glass fibers can be produced by any suitable method from any suitable fiber-forming glass batch composition such as "E" glass or "621" glass or more environmentally acceptable derivatives thereof. The glass fibers are formed in the conventional manner into fibers having any suitable fiber diameter. The cord of coated filamentary material can be used in any suitable method for reinforcing elastomeric matrix material.

The term "elastmeric matrix materials" as used herein includes any natural or synthetic rubbery material. "Natural rubber" as used herein is the elastic solid obtained from the sap or latex of the Havea tree, the major constituent being a homopolymer of 2-methyl-1,3-butadiene (isoprene). By "synthetic rubber" as used herein is meant to encompass polymers based upon at least 2 percent of the conjugated unsaturated monomer, said conjugation being in a 1-3 position in the monomer chain and the final polymer in its uncured state has an extensibility of at least 200 percent and a memory of at least 90 percent, when stretched within its extensibility limits and released instantaneously. The unsaturated monomers which are used in the preparation of synthetic rubber are, but not limited to, chloroprene, butadiene, isoprene, cyclopentadiene, dicyclopentadiene and the like. Other monomers capable of free radical, anionic or cationic polymerization may be incorporated into the polymer chain along with the conjugated unsaturated monomers to form useful synthetic rubbers. These olefins are typically monoethylenically unsaturated monomers. Monoethylenically unsaturated monomers as used herein are characterized by the $CH_2=$ group. These monoethylenically unsaturated monomers are, but not limited to, the acrylic monomers such as methacrylic acid, acrylic acid, acrylonitrile, methacrylonitrile, methyl acrylate, methylmethacrylate, ethyl acrylate, ethyl methacrylate, and the like. Monoolefinic hydrocarbons such as ethylene, butylene, propylene, styrene, alpha-methylstyrene and the like and other functional monounsaturated monomers such as vinyl pyridine, vinyl pyrollidone and the like monomers.

DETAILED DESCRIPTION OF THE INVENTION

Myriad factors are responsible for the final performance of reinforced elastomeric materials. When the reinforcement is glass fibers the parameters include the glass composition, fiber diameter, the components of the sizing composition used in forming the glass fibers, the composition of the aqueous adhesive coating composition used to coat the glass fibers or strands or bundles of fibers, and the construction of the cord constructed from the coated glass fibers and strands. While maintaining the other parameters constant, it has been found surprisingly that the use of the particular non-selfcrosslinkable elastomeric latex in an aqueous coating composition of the present invention gives improved low temperature performance and improved fatigue resistance for the reinforced elastomeric matrix materials.

It is believed, but the present invention is not limited by this belief, that the non-selfcrosslinkable elastomeric latex used in the aqueous adhesive coating composition for filamentary materials along with the presence of a vinyl-pyridine-containing latex and a phenolic aldehyde polymer condensate produces cord having improved flexibility because of the improved flexibility of the dried coating on the strands. Filamentary materials and especially glass fibers properly sized have good flexural fatigue resistance. In using a coating on filamentary materials like glass fibers, the coating starts to experience flexural fatigue before the filamentary materials. The coating eventually may give way and leave the filamentary material unprotected and lacking adhesiveness. Hence, the coating on the filamentary material needs improved fatigue resistance. The aqueous coating of the present invention, when dried on the filamentary material, has improved flexibility and flexural fatigue resistance. Therefore, larger diameter glass fibers can be used in producing the cord, which will have improved flexibility as though finer diameter glass fibers were used because the dried residue of the aqueous coating composition on and/or in the cord has improved flexibility. When the aqueous adhesive coating composition of the present invention is used to treat finer diameter glass fibers for use in producing cord for reinforcing elastomeric matrix materials, the cord will have improved flexibility over that achieved with just the use of the finer diameter glass fibers because of the improved flexibility of the coating itself. This improved flexibility is obtained while still maintaining good adhesion properties.

To obtain coated filamentary material with sufficient flexibility and adhesiveness for use in reinforcing elastomeric materials but that in addition can be woven into a fabric places additional demands on the coated filamentary material. It has been found that weavable coated filamentary material having good performance in reinforcing elastomers can be obtained by utilizing a coating having a Young's modulus for the coating in a definite range obtained in a particular manner with the presence in the coating of certain types and amounts of particular chemical compounds.

For good weavability of coated filamentary material, the Young's modulus for the coating should not exceed about 8,000 p.s.i. (552 bars) at ambient temperature. To achieve this required modulus without detrimentally affecting other properties of the coated filamentary material, the coating can be formulated by two approaches.

The coating can have an increased crosslink density over that contributed by latices such as vinyl pyridine and styrene-containing polymers, copolymers and terpolymers. The increased crosslink density must be effected by the presence of a carboxylated butadiene polymer or carboxylated styrene butadiene copolymer having not more than 75 percent bound styrene and having carboxylation in an amount of about 1 to about 10 weight percent of the polymer or copolymer. If the crosslink density is effected by nonequivalent chemical compounds to the carboxylated butadiene or styrene butadiene, or the amount of bound styrene exceeds the aforementioned limit, the performance of the filament cord reinforced elastomeric material will be detrimentally affected.

The second approach is to increase the gel content of the elastomeric latices in the aqueous coating composition to be at the higher range of a low gel content or medium gel content but lower than a high gel content. More specifically the gel content for the coating composition should be greater than 20 and not greater than 70 percent for all of the latices in the coating composition. If the total gel content is less than 20 weight percent, the weavability of the coated filaments can not be achieved satisfactorily. If the gel content is greater than 70 weight percent, the coated filamentary cord becomes too inflexible and other properties are detrimentally affected. The total gel content can be controlled within the stated range by varying the gel content of any or all of the elastomeric latices present in the coating composition. It is preferred to vary the gel content of the non-self crosslinkable elastomeric latex by varying the gel content of a particular latex or by blending in the same or different amounts two or more latices of different gel contents.

The two aforedescribed approaches to controlling the coating modulus are not mutually exclusive. So both aporoaches can be used in about equal degrees.

In the aqueous adhesive coating composition of the present invention, the vinyl-pyridine-containing latex can be any suitable vinyl-pyridine-containing latex. Nonexclusive examples include vinyl-pyridine copolymers with a diene hydrocarbon monomer and vinyl-pyridine terpolymers with diene hydrocarbon monomer and a vinyl-containing monomer like styrene. The vinyl-pyridine, which is commonly used, is a 2-vinyl-pyridine but others such as 3-vinyl-pyridine, 4-vinyl-pyridine, 2-methyl-5-vinyl-pyridine, 2-methyl-6-vinyl-pyridine, and 2-ethyl-4-vinyl-pyridine may be used. The diene hydrocarbon monomers can be butadiene-1,3; isoprene; 2,3-dimethyl-1, 3-butadiene; 2-ethyl-1, 3-butadiene and the like. Styrene or any other suitable vinyl-containing-styrene-like monomer can be used in preparing the terpolymer. These copolymers and terpolymers can be formed by any suitable method known to those skilled in the art for producing elastomeric polymers in the form of elastomeric latices. The ratio of the diene monomer to the vinylpyridine monomer in the copolymer is generally from 95/5 to about 20/80. For the terpolymer any suitable ratio can be used. A typical ratio of diene monomer to styrene to vinyl-pyridine is 70/15/15.

The phenolic-aldehyde polymer condensate can be any reaction product of a phenolic compound including phenol, polyhydric phenols such as resorcinol, hydroquinone, catechol, and substituted phenols with straight and/or branched chain alkyl radicals having 1 to 16 carbon atoms such as cresol, isopropyl phenol, xylenols and the like and mixtures of these materials. Generally a polyhydric is used at least in part in preparing the phenolic aldehyde condensate polymer. The aldehyde can be a suitable aldehyde for producing such a condensate and includes lower aliphatic aldehydes having 1 to 3 carbon atoms e.g., formaldehyde in its various forms including formalin and polymeric forms such as paraformaldehyde and mixtures thereof, acetaldehyde, propionaldehyde, and crotenaldehyde.

The phenolic compound and aldehyde are reacted in any suitable manner known to those skilled in the art for producing phenolic aldehyde polymers for use in an aqueous adhesive coating composition. A commercial resorcinol formaldehyde resin that can be used by itself or with additional reaction is the material "Penacolite" R-2170 resin available from Koppers Company, Inc. Also a resorcinol formaldehyde condensate polymer can be prepared from resorcinol and formaldehyde or formaldehyde donating material in a process taught in my copending U.S. patent application Ser. No. 956,473 filed Oct. 30, 1978 entitled "Modified Phenolic Aldehyde Resin to Produce an Improved Adhesive Coating and Method of Making Same" (M. M. Girgis) now U.S. Pat. No. 4,314,050. This application is assigned to the assignee of the present application, which is hereby incorporated by reference and made a part hereof.

The term "non-selfcrosslinkable" as used herein refers to a polymeric material that cannot undergo intramolecular or internal crosslinking with itself, but can undergo intermolecular or external crosslinking with other materials. The intramolecular crosslinking means one part of the same molecule or polymeric chain crosslinks with another part of the same molecule or chain. The term "chain" includes the polymeric backbone chain and pendant groups.

The non-selfcrosslinkable elastomeric latex has an elastomeric reaction product formed by the reaction of 1,3-diene hydrocarbon monomers such as butadiene-1,3; isoprene, 2,3-dimethyl-1, 3-butadiene, 2-ethyl-1, 3-butadiene and the like alone as homopolymers or in mixtures as interpolymers; or ethylene-propylene-diene rubber (EPDM) produced in a suitable manner from such dienes as dicyclopentadiene, 5-ethylidene-2-norbornene, 1,4-hexadiene, 5-methylene-2-norborene interpolymerized with ethylene and an alpha-mono-olefin having from 3 to 20 carbon atoms such as propylene; nitrile rubber such as nitrile butadiene latex; or butyl rubber, which is a commercial name for copolymers of isobutylene with small amounts of butadiene or isoprene; or mixtures thereof.

When the gel content of the vinyl pyridine containing elastomeric latex is in the medium range of about 40 to about 70 weight percent the gel content of the non-selfcrosslinkable elastomeric latex is about 10 to about 40 weight percent and preferably about 20 to about 30 weight percent. Generally the gel content of the non-self crosslinkable elastomeric latex is less than 40 weight percent, where the weight percentage is based on the elastomeric latex composition. To obtain this gel content, one or more non-self crosslinkable elastomeric latices can be used. Two or more elastomeric latices can be blended to yield the 40 or less weight percent gel content. The blending involves using a low gel non-self crosslinkable elastomeric latex with a medium gel and/or high gel non-self crosslinkable elastomeric latices. Preferably, the low gel latex has a gel content of about 0.5 to about 25 weight percent and this is blended with a high gel latex having a gel content of around 90 weight percent. Although any low gel latex with a gel content less than 40 weight percent or any high gel latex with a gel content over 70 weight percent could be used. In such a blend with the preferred low gel latex, the ratio of low to high gel would vary from around 1:1 to 9:1 when the gel is around 0.5 weight percent for the low gel latex and not more than 2:1 when the 25 weight percent gel content latex is used. Varying ratios can be used to achieve the gel content of 40 weight percent or less when the low gel latex is combined with other high gel or medium gel latices. In these situations the ratios will generally be lower than around 9:1.

The gel content is measured in a two part test, wherein the first part consists of coagulation of the polymer in the latex and, wherein the second part consists of finding the gel content of the polymer. The steps for the coagulation of the latex and the drying of the polymer involve taking around 100 milliliters of the latex and mixing it with 100 milliliters of a 33% Polygard emulsion, a stabilizing liquid mixture of alkylated arylphosphites, then adding 50 milliliters of 2-propanol to the Polygard emulsion, latex mixture. The mixture is added very slowly to 420 milliliters of a emulsifier mixture consisting of N-alkyl trimethyl ammonium chloride in a 0.3% solution. The latex should be sufficiently kicked out, if not, more 2-propanol is added. The polymer is filtered and washed and placed in an aluminum pan, and the pan is placed in a vacuum oven for at least 16 to 24 hours at ambient temperature. After the polymer has dried to less than 1% moisture, three-tenths (0.3) grams of the polymer are weight out and placed into 100 milliliters of toluene and left standing out of direct light for 24 hours. The toluene polymer mixture is then filtered and the filtrate is placed in an aluminum pan to evaporate the toluene. The polymeric residue is weighed and the percent polymer in the filtrate is determined. The percent gel is then calculated according to the following formula:

Weight % Gel =

$$\frac{\text{Original Weight of Polymer} - 4 \text{ (Weight of Filtrate)}}{\text{Original Weight of Polymer} \times 100}$$

In addition to the gel content being about 0.5 to about 40 weight percent, the particle size of the non-selfcrosslinkable elastomeric latex must be less than 2000 Angstroms and preferably from about 500 to about 1700 Angstroms. The average particle size and particle size distribution can be determined by hydrodynamic chromatography. See, for example, Journal Coll. Inter, Sci., 48, 147, (1974); McHugh et al, J. Coll. Inter. Sci., Vol. IV, pages 549–561, (1976), and Hamielec, Column Chromatography of Particles Suspensions Axial Dispersion Correctionsm, Paper Presented at the Cleveland-Akron GPC/LC Symposium, Cleveland, Ohio (April, 1977).

The low gel content, low average particle size, non-selfcrosslinkable elastomeric latex can be produced by any suitable method that is well known in the art of polymerization techniques. Examples of suitable techniques involve the pre-emulsification technique and the seeding technique in an emulsion polymerization process. The desired gel content can be achieved by any suitable method such as by limiting the polymerization reaction by the use of suitable chain terminating or transfer agents. A suitable non-selfcrosslinkable elastomeric latex is one available from Goodyear Tire and Rubber Company under the trade designation "LPM-6290" which is a 1,3-polybutadiene homopolymer latex. This material has a total solids of 43–46%, a pH of 8.0 to 9.5, a viscosity of 600 max centipoise (RFT No. 1 at 20 rpm), coagulum 0.05% max, mechanical stability 55–75 milligrams, surface tension around 58–74 dynes per centimeter (cm), particle size in the range of 500–2000 Angstrom (Å) and a gel content of around 10 to around 25% max. When this polybutadiene hompolymer latex is used, it is preferably blended with another polybutadiene homopolymer to achieve a gel content in the desired range. The other polybutadiene homopolymer is preferably that available from General Tire and Rubber Company under the trade designation Gen Flo 8037 polybutadiene. This polybutadiene homopolymer has a gel content of around ninety percent, a total solids of around 50 percent, a pH of around 10.5, a viscosity of 50–200 centipoise at room temperature and a particle size in the range of about 1400 to about 1700 Angstroms (Å). The blend is preferably about one of about 50 parts of the homopolymer having a gel content of around 10 to around 25 percent and about 20 parts of the homopolymer having a gel content of 90 percent. This gives a gel content for the polybutadiene of about 32 percent.

The carboxylated butadiene polymer or carboxylated styrene-butadiene copolymer has a bound styrene content less than about 75 weight percent and an amount of carboxylation in the range of about 1 to about 10 weight percent of the copolymer. The carboxylated butadiene polymer or carboxylated styrene butadiene copolymer is present in the coating composition in an amount in the range of 3 to about 10 weight percent of the dry solids of the composition. An amount less than 3 weight percent will yield a coated filamentary material with insufficient weavability. An amount in excess of 10 weight percent with a carboxyl content of 10 weight percent of the copolymer will result in a coated filamentary material that is too stiff. These amounts can be varied, if the amount of bound styrene in the copolymer varies to less than 75 percent. If the amount of bound styrene is lower than 75 percent of the copolymer, then the amount of carboxylation and/or the amount of copolymer in the composition may be higher than the aforementioned amounts. A suitable carboxylated styrene butadiene copolymer for use in the instant invention is the copolymer marketed by Arco Polymer, Inc., under the trade designation Dylex 55E. This material has a bound styrene of 60 percent, an amount of carboxylation in the range of 1 to 5 weight percent of the copolymer, total solids of 50 percent, pH of 10.0, average viscosity of 90 centipoise, and surface tension of 30 dynes/cm. The carboxylated styrene butadiene copolymer can be any obtained by monobasic or dibasic carboxylation agents such as acids or anhydrides. When the polymer is carboxylated butadiene, the amount of carboxylation is in the upper region of the range of around 10 weight percent or above of the polymer because styrene is not present. When styrene is present in the copolymer, the amount of carboxylation or the amount of carboxylated polymer used can be reduced. Although the latter is not reduced below 3 weight percent on a dried solids basis of the coating when styrene is present in amount of 60 percent bound styrene in the copolymer.

When the amount of non-selfcrosslinkable elastomeric latex is around 50 weight percent or more on a dried basis of the aqueous coating composition, the amount of carboxylated styrene butadiene copolymer or an equivalent compound such as carboxylated butadiene polymer with a higher amount of carboxylation is present in an amount of around 6 weight percent. The addition of the carboxylated polymer to the aqueous coating composition gives the coating increased adhesion properties. The amount of carboxylated styrene butadiene added is in the range of about 3 to about 10 weight percent of the dried solids of the aqueous coating composition. Generally the amount of the carboxylated material should increase within this range as an amount of non-selfcrosslinkable elastomeric latex is increased above 50 weight percent on a dried solids basis.

The amounts of the various components in the aqueous adhesive coating composition can be varied to some degree and can be varied in relationship to each other. The amount of the non-selfcrosslinkable elastomeric latex is present in an amount of at least 45 weight percent of the dried solids of the composition and preferably in a predominante amount over the vinyl-pyridine-containing elastomeric latex, when the percent solids of the latices are comparable. The amount of the vinyl-pyridine-containing elastomeric latex can vary within a range from about 5 to about 55 weight percent on a dried basis of the aqueous coating composition and preferably about 10 to about 30 weight percent. The amount of the non-selfcrosslinkable elastomeric latex varies in the range from about 45 to about 95 weight percent on a dried basis of the aqueous coating composition and most preferably about 60 to about 85 weight percent. The phenolic aldehyde resin component can be any suitable resorcinol aldehyde resin, but is preferably a resorcinol formaldehyde resin. The amount of this material can be any suitable amount used in aqueous adhesive coating compositions for treating filamentary materials and such amounts can be in the range from about 4 to about 8 weight percent on a dried basis of the aqueous treating composition. A suitable vinyl-pyridine-containing elastomeric latex is a vinyl-pyridine butadiene-styrene terpolymer such as that commercially available from Goodyear Tire and Rubber Company under the trade designation "LVP-5622B" having a total solids of 40–42%, a pH of 111, a viscosity of 150 centipoise max (RVF number 1 spindle at 20 rpm), coagulum 0.1% max, mooney ML-4 at 212° F., 65–85 and mechanical stability of 1,000 milligrams max and particle size of around 1100 angstrom units max. Another suitable vinyl-pyridine-containing elastomer is a butadiene-vinyl-pyridine styrene terpolymer latex available from Firestone Tire and Rubber Company under the trade designation "SR6642" (having a 41% by weight solids).

In addition to the four main components of the aqueous treating composition, additional components can be used to further improve the final properties of the treated filamentary material.

Such materials include wax emulsions, which can be a microcrystalline wax or paraffinic wax or mixture thereof or any other suitable wax emulsion used in conventional amounts. Suitable wax emulsions are available from Mobil Oil Company under the trade designation "Mobilcer Waxes". Preferably up to 15 parts by weight on a dry solids basis of the aqueous coating composition of the wax are incorporated into the coating composition. Greater than 15 weight percent of wax may detrimentally affect adhesion of the coating composition to the resin matrix. The preferred amount of the wax is up to about 5 weight percent to obtain the maximum benefit. These waxes generally have a melting point of higher than about 50° C. The preferred melting point for the microcrystalline waxes is above about 100° C. or more preferrably above 135° C. When paraffin wax is employed in the coating composition its melting point should generally vary between 50° C. and about 80° C.

Another additional component that may be added to the aqueous treating composition is one or more antioxidants, such as any suitable hindered phenolic type antioxidant or amine type antioxidant. The amount of the antioxidant which is added is generally in the range of around less than 5 parts per 100 parts of the dry rubber to enhance the coating flexibility over a wide range of temperatures. A suitable antioxidant is that available from Akron Dispersion of Akron, Ohio under the trade designation "BOSTEX 294".

Another component that may be included in the aqueous treating composition is a treated diatomaceous earth which provides heat tensile aging characteristics. The chemically treated diatomaceous earths are those hydrothermally reacted with lime or magnesium oxide. Specifically these materials are characterized by hydrocalcium silicates and hydromagnesium silicates. Materials such as Microcell ® and Celikate ® materials available from Johns-Mansville Company are useful diatomaceous earths so long as they contain a calcium oxide level in the range of about 22% to about 28% and a magnesium oxide level of about 16%. Another suitable calcium treated diatomaceous earth in combination with an antioxidant is Paracure ® A09 material.

Other ingredients known to those skilled in the art may be added to the coatng composition to impart varying characteristics thereto. However, the materials as previously recited have been found of particular utility in an improved aqueous coating composition for use in producing coated filamentary cord to be incorporated into elastomeric matrices. With the use of the latices in the present aqueous coating composition, there will also be present the materials used in producing the various latices by emulsion polymerization. These materials include various surfactants, initiators, and chain terminators and/or chain transfer agents and other emulsion polymerization process aids. For example, the chain transfer agent, sodium dimethyl dithiocarbamate, or other mercaptans may be present, which are used to terminate a growing chain radical and start a new one to result in shorter polymeric chains. This is one method of controlling the gel content for the non-selfcrosslinkable elastomer. In addition, other sulfur polymerization modifiers may be present. When the coating is used as a binder in a size, another ingredient that may be present is a silane coupling agent, which can be any suitable silane coupling agent. The silane coupling agent is added, when the aqueous adhesive coating composition is applied to the glass fibers as the glass fibers are formed from molten streams of glass issuing from a bushing. Examples of such silane coupling agents are disclosed in U.S. Pat. No. 4,239,800 hereby incorporated by reference. Other size components may also be present when the coating is used as a binder in a size.

The filamentary material coated with aqueous treating composition can be any of the above-mentioned materials but is preferably glass fibers. The glass fibers can be formed by any suitable method having any appropriate diameter and processed into any appropriate strand. Preferred filament diameters range from about 9.53±0.63 microns to about 13.34±0.63 micron. Any number of filaments can be combined to produce one or more strands of glass fibers. The glass fibers are preferably sized with a suitable aqueous sizing composition known to those skilled in the art for treating glass fibers for use in reinforcing elastomeric materials. An example of a method for producing glass fibers and the glass compositions are disclosed in U.S. Pat. No. 3,619,252 (Roscher) which is hereby incorporated by reference. An example of a method for forming the glass fibers and applying an aqueous sizing composition is disclosed in U.S. Pat. No. 3,946,132 Heddin, hereby incorporated by reference. In addition to the aqueous sizing composition disclosed in the Heddin patent, other sizing compositions can be used. Also the glass can be coated using aqueous sizing mixtures containing one or more of the functional materials of the aqueous coating composition other than having the materials present in the coating. The glass may be sized and coated with a single mixture or the glass may be sized by any of the conventional or known sizing methods using commonly known materials and then later coated as a fiber bundle to produce the cord for reinforcing elastomeric materials. A second method of forming the glass fiber bundles of the present invention is based upon the method described in U.S. Pat. No. 3,718,448 entitled "Fiber Forming and Coating Processing" by Warren W. Drummond and Donald W. Denniston which is assigned to the present assignee and is incorporated herein by reference and made a part hereof.

The method of producing the coated glass fiber cord of the present invention involves contacting a continuous bundle of glass fibers or one or more glass fiber strands with the aqueous coating composition of the invention, drying the coating within and about the bundle, and then curing the coating residing within and about the bundle and combining, usually by twisting, one or more of bundles to produce a coated cord suitable for elastomeric reinforcement. A particularly advantageous method of producing the glass fiber bundles of the present invention is based upon the method described in U.S. Pat. No. 3,619,252 "Manufacture of Elastomeric Coated Glass Fibers" by Alfred M. Roscher and U.S. Pat. Nos. 4,239,00 and 4,238,595 which are all incorporated herein by reference.

The dried coated glass fiber strand cord can be used in any suitable method for producing fiber reinforced elastomeric materials. It is preferred that the cord be used in a weaving process for producing reinforced elastomeric matrix materials although the cord can be used in a calandering process.

DESCRIPTION OF PREFERRED EMBODIMENT

The aqueous adhesive treating composition of the present invention is preferrably used with sized glass fiber strands, wherein the glass fibers are produced in the conventional manner and sized with an aqueous treating composition. The aqueous treating composition preferrably is a non-starch containing aqueous sizing composition comprised of a high molecular weight, viscous, liquid polyoxyalkylene polyol and extremely viscous, high molecular weight liquid polyoxyalkylene polyol, or a carboxylated elastomeric latex, a lubricant modified gamma amino propyl triethoxysilane available under the trade designation "Y-9072" or "A-1108" from Union Carbide Corporation and a cationic lubricant. The glass fibers sized with this aqueous sizing composition are preferably K-fibers formed into K-15 or K-5 strands.

A plurality of the glass fiber strand, most preferably 3 K-15 glass fiber strands, although 1/0 and 2/0 strands can also be used, are combined in parallel relation and passed through a guide in tangential contact across motor driven rollers. The rollers are partially immersed in the aqueous adhesive coating composition and these rollers pick up the coating material when rotated. Th coating which is picked up is brought into contact with the glass fiber strands, coating and impregnating the combined bundle of strands. Relaxation of the tension of the combined bundle of strands opens the spacing between the fibers and between strands enhancing impregnation of the coating into the bundle. Typically, the coating composition solids of the aqueous material would be about 15 to about 35 weight percent depending on the total amount of coating composition solids to be imparted into the glass fiber cord. Lower solids levels will produce cord with low coating add-on based on the weight of the glass and a higher solids content will produce a coated glass fiber cord having a high amount of coating composition solids based on the weight of the glass. Thus, coating add-on weight is about 15 to about 35 percent based on the weight of the glass fibers, more preferably 15 to 25 percent, to provide a coated glass fiber bundle or cord which is useful for the reinforcement of elastomeric matrices.

The aqueous adhesive coating composition is preferably comprised of the vinyl pyridine-butadiene-styrene terpolymer latex wherein the ratio of styrene to butadiene is typically about 1/5 which counts for about 85 to 95% of the mole basis of the monomeric components of the polymer. The other 5 to 15 percent is vinyl pyridine monomer. The vinyl pyridine constitutent of the polymer is considered to impart desirable characteristics of the adhesion. The styrene butadiene-vinyl pyridine latex is usually 35 to 50% by weight solids and has a gel content in the medium range of about 40 to about 70 weight percent. On a dry solids basis of the aqueous coating composition about 10 to about 30 weight percent is constituted by the terpolymer latex.

The non-selfcrosslinkable elastomeric latex is preferably a blend of polybutadiene homopolymers to yield a gel content for butadiene homopolymer of around 22 to 30 weight percent and a average particle size of less than 2000 and preferably less than 1700 Å and most preferably around 700 to around 1700 Å (angstroms). The polybutadiene homopolymer is present in the aqueous treating composition in an amount of about 35 to about 98 and preferably about 45 to about 90 weight percent on a dry solids basis of the coating composition.

The carboxylated styrene butadiene copolymer has an amount of bound styrene of 60 percent and an amount of carboxylation of around 2 to 3 percent. The carboxylated styrene butadiene is present in an amount of around 5 to 7 weight percent on a dried solids basis of the coating.

The aqueous coating composition also contains the resorcinol formaldehyde resin which is preferably produced in accordance with allowed U.S. patent application Ser. No. 956,473 filed Oct. 30, 1978 entitled "Modified Phenolic Aldehyde Resin to Produce an Improved Adhesive Coating and Method of Making Same" by Mikhail M. Girgis which is assigned to the present assignee and is incorporated herein by reference and made a part hereof. The amount of the resorcinol formaldehyde resin in the aqueous coating composition will range from about 5 to about 8 weight percent of the dried coating. Also in the aqueous treating composition there will be an amount of wax emulsion in the range of about 1 to about 10 weight percent of the dried coating. Also it is preferred to include an antioxidant such as a hindered phenolic type antioxidant in the amount of around 0.5 to about 3 weight percent based on the dried coating.

After contacting the glass fiber bundle with the coating composition for sufficient time to fully impregnate the bundle with water and solids-containing coating, the bundles or strands are passed through a dielectric heater or drying oven although any type of drying device can be used. The drying oven is so designed and operated that the water is removed rapidly from the inside of the bundle as well as from the surface of the bundle without substantial migration of the solids from the interior to the surface of the bundle and without excessive blistering.

The dried glass fiber bundle is then subjected to heat to partially cure the elastomeric adhesive coatings substantially throughout the bundle. It is preferred to partially cure the coating and then complete the curing of the coating on the glass fibers when the coated fiber cord is embedded in the rubber matrix as reinforcement and the rubber matrix is cured to produce the final article.

Typically after the bundle of fibers or strand is partially cured two or more, preferably three dried, coated strands are twisted together to produce the cord, which is used to reinforce the elastomeric matrix material.

In the foregoing disclosure and that which follows, the reference to "dried solids of the aqueous coating composition" or "based on the dried solids of the coating" refers to the same measurement. This measurement is the weight percent of the dried residue of the aqueous coating composition, when the coating is dried to a very low moisture content in air or at elevated temperatures.

Additional information concerning the preferred embodiment of the present invention is related in the following examples, although these examples do not limit the scope of the invention to these specific embodiments.

EXAMPLE 1

An aqueous adhesive coating composition is prepared by having the following composition:

| | Ingredients | 800-Gallon Mix (3028 Liters) | |
|---|---|---|---|
| Premix Vessel | | | |
| I. | Deionized Water (110° F.) | 36.8 gal | (139 L.) |
| | Resorcinol | 102.2 lb | (46.4 kg.) |
| | Formaldehyde | 82.0 lb | (37.3 kg.) |
| II. | Deionized Water | 30.7 lb | (13.9 kg.) |
| | Potassium Hydroxide | 2.3 lb | (1 kg.) |
| Main Vessel | | | |
| I. | Polybutadiene Homopolymer latex | 2400 lb | (1089.6 kg.) |
| | Vinyl pyridine butadiene-styrene terpolymer latex | 1153 lb | (523.5 kg.) |
| | Ratio of Polybutadiene/Vinyl pyridine terpolymer | 70/30 | |
| | Bostex 294 hindered phenol (antioxidant) | 30.7 lb | (13.9 kg.) |
| | Mobilcer Q wax emulsion | 215.4 lb | (97.8 kg.) |
| | Deionized Water | 260 gal | (984 Liters) |
| II. | Resorcinol formaldehyde resin | from premix | |
| III. | Deionized Water | 4.6 gal | (17.46) |
| | Ammonium Hydroxide | 9.3 lb | (4.2 kg.) |
| IV. | Deionized Water | 4.6 gal | (2.1 kg.) |
| | Carboxylated styrene butadiene copolymer latex | 61.6 lb | (27.9 kg.) |

To a premix vessel there is added water at 110° F. (43.3° C.) and the resorcinol is added to the water and agitated until completely dissolved. At this point the formaldehyde is added to the premix vessel. The premix temperature should be around 80° F. (27° C.), and if it is not it must be adjusted to around 78°–80° F. (25°–27° C.) and the contents of the premix vessel aged for 4 hours. The pH during the aging should be around 5±0.5. Deionized water and potassium hydroxide are mixed together and added slowly to the premix vessel. The premix vessel's temperature is maintained at a temperature of around 75 (23° C.) to 80° F. (27° C.) for around five hours and a pH of 7.5 or higher.

To a main mix tank there is added the polybutadiene homopolymer with the desired gel content and particle size, the polyvinyl-pyridine-butadiene-styrene terpolymer latex and water along with the antioxidant and the wax emulsion. Then the resorcinol formaldehyde resin from the premix vessel is added to the main mix tank and the mixture is agitated for 25 minutes and this mixture is allowed to age for around ten hours. Water and ammonium hydroxide are added together and added to the main mix tank after the aging period. This mixture is stirred for around ten minutes and then the carboxylated styrene-butadiene copolymer latex is combined with water and added to the main mix tank with agitation. A suitable carboxylated styrene butadiene latex is that commercially available from Arco polymers under the trade designation "Dylex 55-E".

Glass fiber strands of the K-15 variety were prepared by treating glass fibers with a starch containing aqueous sizing composition during their formation. The aqueous sizing composition had a high amylose starch fraction and a low amylose starch fraction, and an amino coupling agent, a cationic lubricant (Cation-X) and an LOI of the sizing on the strand of 0.55.

Preferably in the practice of this invention the cord should be constructed of K-15 3/0 product when the cord is to be utilized in the carcass and the belts of radial tires. The K-15 strand typically has 1,000 filaments therein, each filament having a diameter of about 13.34±0.63 micron (5.25±0.25×10⁻⁴ inch). Also the cord can be constructed of G-75-5/0 strands when the cord is to be used in biased belted tires and G-75-10/0 or G-75/15/0 when the cord is to be utilized in the carcass and the belts of radial tires. The G-fibers characteristically have a diameter of 9.53±0.63 microns and have a filament count of 2,000 in a cord being constructed of five strands, each strand having 400 filaments. When G-cord is used in biased belted tires the cord should be constructed of five strands and when the cord is to be used in radial tires, there should be 10 to 15 strands per cord. The 10 to 15 strands allow higher packing of the cord per unit area thereby providing greater strength to the tire carcass. The strength is necessary to obtain desirable properties in radial ply tires. It is preferred that three separately impregnated bundles of filaments be twisted together to form the finished 3/0 tire cord. These three bundles of K-15 1/0 fibers are coated by the method described in the preferred embodiment with the aqueous adhesive coating composition specified above, dried, cured and then twisted together to form the finished 3/0 tire cord. This tire cord was then used to reinforce rubber and the reinforced rubber tested for its properties.

In addition to the preparation of the cord, a film of the coating was prepared for testing by the method taught in U.S. Pat. No. 4,047,429 (Bartrug et al) hereby incorporated by reference.

ILLUSTRATIVE EXAMPLE

An aqueous coating composition was prepared having the following composition.

| Ingredients | 205 Gal. Mix (776 liters) | |
|---|---|---|
| Deionized Water (110° F.) | 12 gal | (45.4 liters) |
| Resorcinol | 20.8 lbs | (9.4 Kg.) |
| Formaldehyde | 22.8 lbs | (10.3 Kg.) |
| Deionized Water | 2 gal | (7.6 liters) |
| Potassium Hydroxide | 0.6 lb | (0.27 Kg.) |
| Polybutadiene Homopolymer latex (Firestone 6803) | 532 lbs. | (241.3 Kg.) |
| Vinyl pyridine styrene butadiene terpolymer latex (Firestone 6642) | 400 lbs | (181.4 Kg.) |
| Ratio of polybutadiene/homopolymer/vinyl pyridine terpolymer | 60/40 | |
| Bostex 294 hindered phenol antioxidant | 8 lbs | (3.63 kg.) |
| Deionized Water | 48 gal | (181.7 liters) |
| Deionized Water | 10 gal | (37.85 liters) |
| Mobilcer Q | 40 lbs | (18.1 kg.) |
| Paracure A-09 | 4 lbs | (1.81 kg.) |
| Deionized Water | 4 gal | (15.1 liters) |
| Ammonium Hydroxide | 2.4 lbs | (1.09 kg.) |
| Deionized Water | 4 gal | (15.14 liters) |
| Resorcinol | 4 lbs | (1.81 kg.) |

In preparing the aforelisted formulation the resorcinol formaldehyde resin was prepared substantially the same way as in Example 1 and the latices and antioxidant were mixed in the same manner. There wasn't any carboxylated styrene butadiene copolymer used, but a mixture of calcium treated diatomaceous earth 50% and 2,6-ditertiary butyl phenol 50% available under the name PARACURE® A09 material was combined with the wax emulsion and water. This mixture was added to the mixture of latices. Then the resorcinol formaldehyde resin was added and then the water and ammonium hydroxide that had been mixed together were added and the material was agitated.

In the Illustrative Example, the vinyl-pyridine-butadiene-terpolymer latex and the polybutadiene homopolymer latex are those that are available from Firestone Tire and Rubber Company under the respective trade designations of 6642 and 6803. The 6642 is a vinyl-pyridine-terpolymer having a pH of 10.60, a percent solids of 38.9. The polybutadiene homopolymer 6803 is a high gel polybutadiene having an average weight percent gel of 90% with an average particle size of between 3100 and 3900 Å, an average percent solids of 53.2% and an average pH of 9.8 and an average surface tension of 46.2.

EXAMPLE 3

The aqueous coating composition was prepared in the same manner as Example 1. Instead of applying the coating to starch-sized glass fiber strands, the coating was applied to strands having the dried residue of the following aqueous size:

| | |
|---|---|
| Water deionized | 24700 gm. |
| Polyoxyalkylene Polyol 7,000 Avg. Mol. wt. | 300 gm. |
| Polyoxyalkylene Polyol 10,000 Avg. Mol. wt. | 300 gm. |
| Cationic Lubricant | 200 gm. |
| Lubricant Modified Amino Silane | 200 gm. |

This sizing was applied to the glass fibers in the same manner as in Example 1. The cord so produced was tested and the data are reported in Table II.

This aqueous treating composition was used in the same method as in Example 1 to coat K-15 glass fiber strands that were constructed into tire cord in the same manner as that in Example 1. Also coating films were prepared in accordance with the method of U.S. Pat. No. 4,047,429 (Bartrug).

The tire cord and films of Example 1 and the tire cord and films of the Illustrative Example were tested for their physical properties. The test results are shown in Tables I and II.

TABLE I

Physical Properties of Cured Coating Films

| Coating Film | Tensile (psi) | Young's Modulus (psi) | Elongation at Break % |
|---|---|---|---|
| at 0° F. (−17.8° C.) | | | |
| Illustrative Example | 1845 | 18,000 | 70 |
| Example 1 | 2145 | 8,500 | 190 |
| at 75° F. (25° C.) | | | |
| Illustrative Example | 1130 | 9,770 | 60 |
| Example 1 | 1030 | 3,595 | 165 |
| at 250° F. (121° C.) | | | |
| Illustrative Example | 710 | 2,885 | 45 |
| Example 1 | 710 | 1,115 | 115 |

TABLE II

Comparative Tire Cord Properties

| Cord | Construction | DPU | In Air Tensile lb |
|---|---|---|---|
| Illustrative Example | K-15 1/3 | 20.1 | 125 |
| Example 1 | K-15 3/0 | 20.8 | 145 |
| Example 1 | K-15 3/0 | 20.3 | — |
| Example 3 | K-15 3/0 | 21.2 | 165 |

| Cord | In Rubber Tensile (lb) | | Adhesion McCreary lb/rating | Sincofat 18,000 Cycles Room Temp. | Firestone Cold Wheel Test Temp. of Tires is 50° F. # of Cycles/Belt Rating | |
|---|---|---|---|---|---|---|
| | | | | | TOP | BOTTOM |
| Illustrative Example | 213 | 185 | 50/4.9 | 0 | 25 RNF | 0 | 0 |
| | | | | | 13 TPBK | 0.5 | 1.5 |
| | | | | | 25 TPBK | 2.0 | 4.0 |
| | | | | | 22 TPBK | 0.0 | 3.0 |
| | | | | | 10 TPBK | 0.0 | 3.0 |
| Example 1 | 190 | — | 36/4.2 | — | | — | |
| Example 1 | 187 | 187 | 36/4.1 | 138 | | — | |
| Example 3 | 215 | — | 53/4.9 | 167 | 25 RNF(5)[1] | 0 | 0 |

In-Air-Tensile - was measured using modified polyurethane 4-D jaws.
RNF — Removed No Failure
TPBK — Tire Ply Breakage
Rating
0 - Excellent
5 - Poor
[1](5) five specimens all having same results.

The testing procedures used in obtaining the data of Table I are conventional procedures used for obtaining Young's Modulus, Tensile and Elongation. The Elongation test is more fully described in U.S. Pat. No. 4,238,595 hereby incorporated by reference. The data of Table II in Rubber Tensile, Adhesion, and McCreary tests were obtained by procedures more fully described in U.S. Pat. No. 4,238,595 and hereby incorporated by reference. The McCreary Adhesion Test is similar to the strip adhesion test described in the aforementioned patent and the In Air Tensile is performed on the same device without the same being embedded in rubber. The Sincofat test which is an acronym for Single Cord Fatigue test is performed on a MIT Tinius Olson Flex Tester. The cord is tested in cured rubber and run to the designated number of cycles and tested for tensile in rubber. The sample is tested at ambient and sub-ambient temperatures.

The Firestone Indoor Cold Wheel Test tests tires that are cooled to −50° F. and immediately mounted on a loaded wheel and run for 25 minutes. This is one cycle. Cycles are added until distortion occurs or discontinued after 25 cycles. The tire is then stripped and the belts are rated. Zero rating is no cord failure and 5 is excessive cord breakage. If the tire is removed after 25 cycles with no failure, it is rated as RNF (Removed No Failure).

The results of Table I and Table II show the improved flexibility and fatigue resistance achieved by using the aqueous coating compositions of the present invention with filamentry materials to reinforce elastomeric matrix materials. This is shown in Table II by improved flexing in the Sincofat test and improved fatigue resistance in the Firestone Cold Wheel Test.

EXAMPLE 4

An aqueous coating composition was prepared from the following formulation:

| Components | Amounts for 1892.5 Liter Mix |
|---|---|
| Deionized water resorcinol | 77.9 liters |
| formaldehyde | 25.9 Kg. |
| | 20.8 Kg. |
| Deionized water | 7.67 liters |
| potassium hydroxide | .57 Kg. |
| Polybutadiene 10-25 weight percent gel content Goodyear LPM-6290 | 427.4 Kg. |
| Polybutadiene 90 percent gel content General 8037 | 154.0 Kg. |
| Vinyl pyridine styrene butadiene terpolymer (Goodyear 5622) medium gel content | 292.5 Kg. |
| Antioxidant (Bostex 294) | 7.8 Kg. |
| Wax emulsion (Mobilcer Q) | 54.4 Kg. |
| Water for wax emulsion | 151.2 liters |

-continued

| Components | Amounts for 1892.5 Liter Mix |
|---|---|
| Deionized water | 568.9 liters |
| Deionized water | 9.83 liters |
| Ammonium hydroxide | 2.3 Kg. |
| Deionized water | 9.83 liters |
| Carboxylated styrene butadiene copolymer (Dylex latex 55E) | 62.7 Kg. |
| Total | 1873.7 Kg. |

The aqueous coating composition was prepared by a method similar to the method for preparing the coating composition of Example 1. The only exception is in the addition of two polybutadiene homopolymers. The lower gel polybutadiene was added first to the main mix tank. The higher gel polybutadiene was added to the main mix tank already having present the lower gel polybutadiene. The vinyl pyridine containing terpolymer, antioxidant and wax emulsion were added in the same manner as Example 1 and the remaining additions were also performed in the same manner.

The aqueous coating composition was used to treat glass fiber strand bundles of the K-15 1/3 variety. The number "1" before the diagonal line indicates the number of strands twisted together in making the strand bundle or yarn. The number "3" after the diagonal indicates the number of twisted strands or bundles which have been plied together.

The strands in this K-15 yarn were formed in a conventional manner using the aqueous sizing composition shown in Example 3. The K-15 1/3 yarn was coated with the aqueous coating by the method described in the preferred embodiment.

The coated cord of this example was compared with the coated cord of Example 1 in comparative experiments. The properties tested were in rubber tensile, in-air tensile, adhesion, blow-hole testing and weaving testing. These tests were conducted with conventional procedures with the same variables for each cord. The results are shown in Table III.

TABLE III

| Property | Cord of Example 1 | Cord of Example 4 |
|---|---|---|
| In-Rubber Tensile lb. force (Newtons) | 212 (943) | 217 (965) |
| In-Air Tensile lb. force (Newtons) | 168 (747) | 178 (792) |
| Adhesion | | |
| U-Adhesion lb. force (Newtons) | 37 (165) | 36 (160) |
| Strip Adhesion Rm. Temp Lb. force (Rating) | 41/5.0 | 39/4.5 |
| at 250° F. (lb. force/rating) | 45/5.0 | 41/4.5 |
| Blow-Hole Test 330° F. (177° C.) | | |
| Stock A | | |
| at 16 minutes | Slight blowing | Very slight blowing |
| at 17 minutes | Very slight blowing | No blowing |
| Stock B | | |
| at 14 minutes | Slight blowing | Very slight blowing |
| at 16 minutes | Very slight blowing | No blowing |
| Weaving Test | 280 yards (256 meters) | 1200 yards (1097 meters) |

In the weaving test, the coated cord was used in a standard weaving operation to form fabric. The number obtained indicates the yardage of cord removed from the cord package for weaving. This shows the improved weaving performance of the Example 4 cord.

The in-rubber tensile, in-air tensile, adhesion, both U and strip, and blow-holes tests were conducted as described in U.S. Pat. Nos. 4,238,595 and 4,164,485 hereby incorporated by reference.

The foregoing has disclosed an aqueous coating composition for use with filamentary materials to provide cords for reinforcing elastomeric matrix materials, where the reinforced materials have improved flexibility and improved fatigue resistance and can be woven into fabric. The improved flexibility translates from the improved flexibility of the coating and the coated filamentary materials. These advantages are achieved by using in a coating composition, the non-selfcrosslinkable elastomeric latex having a low gel content and low average particle size having a vinyl pyridine containing copolymer or terpolymer and a carboxylated polymer with a controlled crosslink density where the total gel of the latices is controlled and phenolic aldehyde resin. The filamentary material may be neutral or synthetic fibers including cotton, rayon, polyamides, polyesters, glass fibers and the like.

I claim:

1. An aqueous adhesive coating composition for treating filamentary materials to reinforce elastomeric matrix materials, comprising:
   (1) at least three elastomeric materials, where the total gel content of the coating composition attributable to the elastomeric materials is less than about 70 weight percent based on the aqueous coating composition, wherein the three elastomeric materials are:
   A. A vinyl-pyridine-containing elastomeric latex selected from the group consisting of an elastomeric copolymer latex produced from a vinyl pyridine-containing monomer and 1,3-diene hydrocarbon monomer and an elastomeric terpolymer latex produced from vinyl pyridine-containing monomer, 1,3-diene hydrocarbon monomer and a vinyl-containing monomer,
   B. non-self-crosslinkable elastomeric homopolymer or interpolymer latex, wherein the elastomer has been formed by the reaction of 1,3-diene hydrocarbon monomers, and where the elastomeric latex has a gel content of less than 40% and an average particle size of less than around 2000 angstroms.
   C. carboxylated butadiene polymer having an amount of bound styrene not exceeding 75 weight percent, of the copolymer and having an amount of carboxylation in the range of about 1 to about 10 weight percent, of the copolymer where the amount of the copolymer present is in the range of 3 to about 10 weight percent of the coating on a dry solids basis, and
   2. phenolic aldehyde condensate polymer,
   3. and water.

2. The composition of claim 1, wherein the 1,3-diene hydrocarbon monomer is 1,3-butadiene.

3. The composition of claim 1, wherein the vinyl-containing monomer is styrene.

4. The composition of claim 1, wherein the phenolic aldehyde condensation polymer is a resorcinol-formaldehyde condensate polymer.

5. The composition of claim 4, wherein the resorcinol formaldehyde polymer has predominantly trimer polymers.

6. The composition of claim 1, wherein the nonself-crosslinkable elastomeric latex is a polybutadiene homopolymer latex.

7. The composition according to claim 1, which includes a wax emulsion.

8. The composition of claim 1, where the carboxylated butadiene polymer is carboxylated styrene-butadiene copolymer latex, wherein the percentage of bound styrene is 60 and the carboxylation is in the range of about 1 to about 5 weight percent both based on the weight of the copolymer.

9. The composition of claim 1, which includes an antioxidant.

10. The composition of claim 1 or 6, wherein the amount of non-self crosslinkable elastomeric latex is predominant to the amount of the vinyl pyridine-containing copolymer or terpolymer.

11. Aqueous coating composition of claim 1, where the non-self crosslinkable elastomeric latex is present in an amount of about 45 to about 95 weight percent of the dried aqueous coating.

12. Aqueous treating composition of claim 1, wherein the gel content of the non-self crosslinkable elastomeric latex is achieved by a blend of low gel, medium gel and/or high gel non-self crosslinkable elastomeric latices.

13. An aqueous coating composition for treating glass fibers, strands or bundles of glass fibers to be used in reinforcing elastomeric matrix materials, comprising in weight percent of the dried aqueous coating:
   A. about 20 to 55 percent of a vinyl pyridine-1,3-diene hydrocarbon-styrene terpolymer,
   B. about 45 to about 98 percent of a non-self crosslinkable elastomeric homopolymer or interpolymer latex, wherein the elastomer has been formed by the reaction of 1,3-diene hydrocarbon monomers, and where the elastomeric latex has a gel content of less than around 40 weight percent and an average particle size of less than around 2000 angstroms,
   C. 3 to about 10 percent of carboxylated styrene butadiene copolymer, where the amount of bound styrene does not exceed about 75 weight percent, and where the amount of carboxylation is in the range of about 1 to about 10 weight percent, where both the weight percentages are based on the weight of the copolymer, and where the total gel content for the vinyl-pyridine 1,3-diene hydrocarbon-styrene, non-self crosslinkable latex and carboxylated styrene butadiene copolymer is in the range of about 20 to about 70 weight percent of the coating composition, and
   D. about 1 to about 8 percent of a resorcinol formaldehyde condensate polymer,
   E. about 1 to about 10 percent of a wax emulsion,
   F. about 0.5 to about 3 percent of an antioxidant,
   G. water in an amount to give a total solids for an aqueous composition in the range of about 15 to about 35 weight percent.

14. Aqueous treating composition according to claim 13, wherein the 1,3-diene hydrocarbon of the terpolymer is butadiene.

15. Aqueous coating composition of claim 13, wherein the resorcinol formaldehyde polymer is comprised of predominantly trimer polymers.

16. Aqueous coating composition of claim 13, wherein the non-self crosslinkable elastomeric latex is a polybutadiene homopolymer latex.

17. Aqueous treating composition of claim 16, wherein the gel content of the polybutadiene latex is achieved by a blend of a polybutadiene latex having a gel content of around 0.5 to around 25 percent and a polybutadiene latex having a gel content of around 90 percent.

18. Aqueous treating composition of claim 1 or 17, wherein the gel content of the non-self crosslinkable elastomeric latex or polybutadiene latex is in the range of about 10 to about 30 weight percent of the latex when the vinyl pyridine-containing latex is a medium gel latex.

19. Aqueous coating composition of claim 1 or 16, wherein the average particle size of the non-self crosslinkable elastomeric latex is in the range of about 700 to about 1700 angstroms.

20. Aqueous coating composition of claim 1, wherein the vinyl pyridine-containing elastomeric latex is a vinyl-pyridine butadiene styrene terpolymer latex.

* * * * *